United States Patent
Li et al.

(10) Patent No.: US 8,813,189 B2
(45) Date of Patent: Aug. 19, 2014

(54) SYSTEM AND METHOD FOR CAPTURING NETWORK TRAFFIC

(75) Inventors: Qing Li, Cupertino, CA (US); Ronald Andrew Frederick, Mountain View, CA (US)

(73) Assignee: Blue Coat Systems, Inc., Sunnyvale, CA (US)

(*) Notice: Subject to any disclaimer, the term of this patent is extended or adjusted under 35 U.S.C. 154(b) by 11 days.

(21) Appl. No.: 13/299,773

(22) Filed: Nov. 18, 2011

(65) Prior Publication Data
US 2013/0133032 A1 May 23, 2013

(51) Int. Cl.
*G06F 21/00* (2013.01)
(52) U.S. Cl.
USPC ............................................. 726/3; 713/155
(58) Field of Classification Search
None
See application file for complete search history.

(56) References Cited

U.S. PATENT DOCUMENTS

| 7,149,892 | B2* | 12/2006 | Freed et al. | 713/151 |
| 7,853,781 | B2* | 12/2010 | Freed et al. | 713/151 |
| 7,945,666 | B2* | 5/2011 | Wunner | 709/225 |
| 2011/0173436 | A1* | 7/2011 | VanHeyningen et al. | 713/150 |
| 2011/0264905 | A1* | 10/2011 | Ovsiannikov | 713/151 |

* cited by examiner

*Primary Examiner* — Fikremariam A Yalew
(74) *Attorney, Agent, or Firm* — Baker Botts L.L.P.

(57) ABSTRACT

In certain embodiments, a method includes receiving, by a capture device, traffic flows transmitted by a plurality of client devices, each of the traffic flows being associated with one of the plurality of client devices and comprising encrypted data. The method further includes receiving, by the capture device, flow information communicated from a proxy server communicatively coupled to the capture device, the flow information comprising an identification of a particular traffic flow and a session key associated with the particular traffic flow. The method further includes storing, by the capture device, encrypted data of the particular traffic flow identified by the flow information supplied by the proxy server; storing, by the capture device, the session key associated with the particular traffic flow; and discarding, by the capture device, any of the plurality of received traffic flows not identified in the flow information received from the proxy server.

36 Claims, 5 Drawing Sheets

SYSTEM AND METHOD FOR CAPTURING NETWORK TRAFFIC

TECHNICAL FIELD

This disclosure generally relates to capturing and examining network traffic.

BACKGROUND

Communications networks often carry various types of traffic from many different sources. For example, an Internet Protocol (IP) network, such as the Internet, often carries both encrypted and unencrypted IP traffic. In some situations, it may be desirable to capture and examine traffic flowing through a network. For example, demands from law enforcement agencies, regulatory policies, court orders, and the like may require the capture and examination of a traffic flow from a particular person or entity.

SUMMARY

In accordance with the present invention, the disadvantages and problems associated with capturing network traffic have been substantially reduced or eliminated.

According to one embodiment of the present invention, a method includes receiving, by a capture device, traffic flows transmitted by a plurality of client devices, each of the traffic flows being associated with one of the plurality of client devices and comprising encrypted data. The method further includes receiving, by the capture device, flow information communicated from a proxy server communicatively coupled to the capture device, the flow information comprising an identification of a particular traffic flow and a session key associated with the particular traffic flow. The method further includes storing, by the capture device, encrypted data of the particular traffic flow identified by the flow information supplied by the proxy server; storing, by the capture device, the session key associated with the particular traffic flow; and discarding, by the capture device, any of the plurality of received traffic flows not identified in the flow information received from the proxy server.

Certain embodiments of the disclosure may provide one or more advantages. An advantage of one embodiment may be that full encrypted or unencrypted traffic flows may be captured and securely stored by one or more capture devices. Another advantage of certain embodiments may be that a proxy server coupled to one or more capture devices instructs the one or more capture devices to capture certain traffic flows and discard others. Another advantage of certain embodiments may be that captured encrypted traffic flows may be unencrypted and exported to a network analyzer for analysis.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Communications networks often carry large volumes of different types of traffic from many different sources. For example, a public Internet Protocol (IP) network, such as the Internet, often carries both encrypted and unencrypted IP traffic. As another example, an organization such as a government entity or a financial institution may employ a communications network that allows its employees to communicate in the normal course of business. In many situations, communications networks carry network traffic at high bitrates such as gigabit and beyond.

In some situations, it may be desirable to capture and examine the network traffic flowing through a network. For example, demands from law enforcement agencies, regulatory policies, court orders, and the like may require the capture and examination of a traffic flow from a particular person or entity. However, capturing entire traffic flows at or near wire speed, such as gigabit, and performing corresponding traffic decryption and analysis, is not possible with previous implementations due to the lack of the ability to negotiate session keys with the sources of traffic flows, and due to the storage demands and computing power needed to perform the decryption tasks.

The teachings of the disclosure recognize that it would be desirable to provide a system and method for capturing and storing both encrypted and unencrypted traffic flows of specific flow properties from a network at high bitrates. FIGS. 1 through 5 below illustrate a system and method for capturing network traffic according to the teachings of the disclosure.

Figure 1:
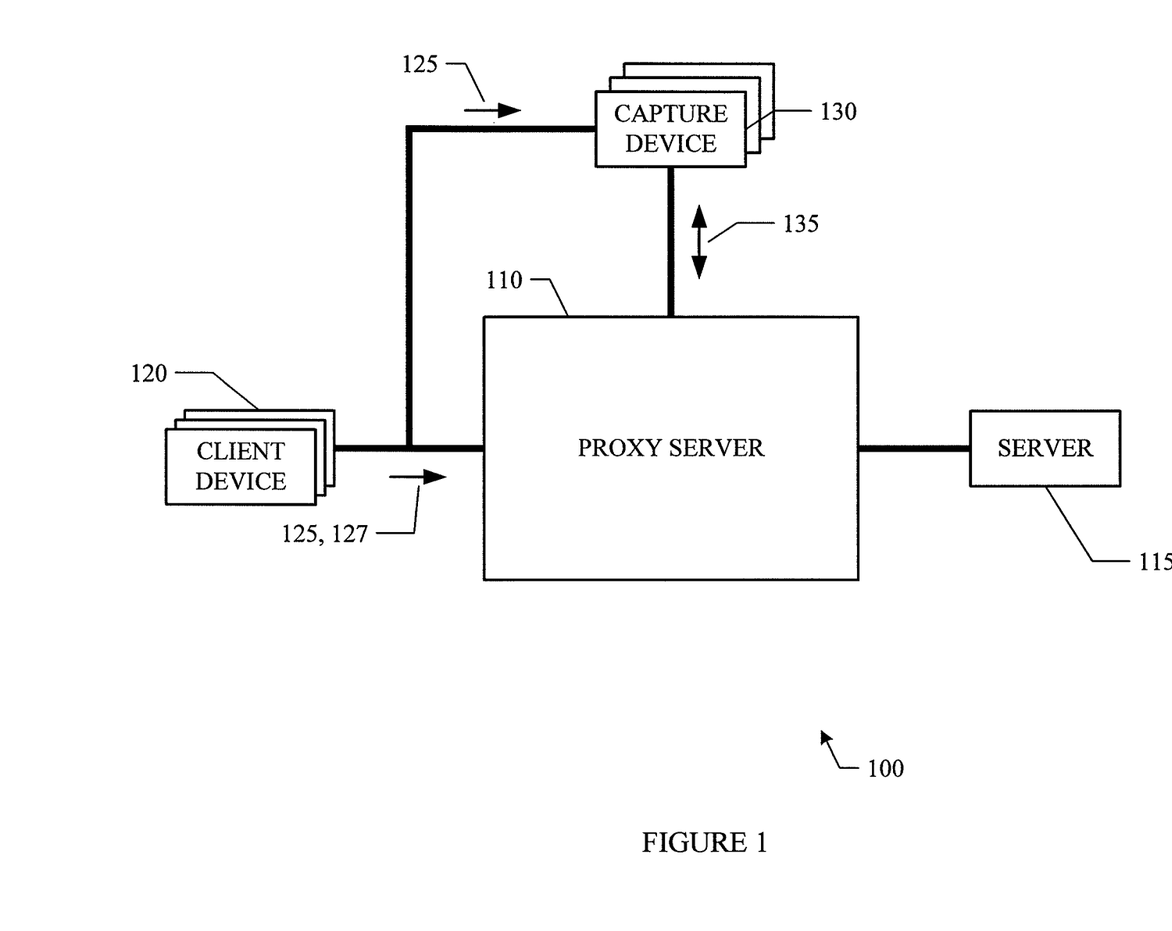
FIGS. 1 and 2 illustrate example systems for capturing network traffic, according to certain embodiments of the present disclosure.

FIG. 1 illustrates an example system 100 for capturing network traffic according to certain embodiments of the disclosure. System 100 includes one or more client devices 120, one or more capture devices 130, a proxy server 110, and a server 115. Client devices 120 are communicatively coupled to proxy server 110 and capture devices 130. Proxy server 110 is additionally communicatively coupled to capture devices 130.

In general, client devices 120 attempt to communicate with server 115. In certain embodiments, for example, client devices 120 may be any type of computing or network devices that attempt to communicate with server 115 across the Internet using a secure communications session such as Secure Socket Layer (SSL), Internet Protocol Security (IPSec), Transport Layer Security (TLS), and the like. Proxy server 110 functions as a "man-in-the-middle" device by terminating the communications session between client devices 120 and server 115 and then masquerading as server 115 to client devices 120 and as client devices 120 to server 115. To do this, proxy server 110 establishes communications sessions with client devices 120 and consequently receives a session key 127 from each client device 120.

Client devices 120 transmit traffic flows 125 that are ultimately received by at least one capture device 130. Traffic flows 125 may include any type of data such as encrypted or unencrypted data, and each traffic flow 125 may be associated with a particular client device 120. Proxy server 110 selects a particular traffic flow 125 that is associated with a particular client device 120 to store on one or more capture devices 130. Proxy server 110 then communicates flow information 135 to at least one capture device 130 across a secure communications channel. In some embodiments, flow information 135 includes session key 127 received from the particular client device 120 and an identification of the selected traffic flow 125 from the particular client device 120. Capture devices 130 store the encrypted or unencrypted data of the selected traffic flow 125 based on flow information 135. For encrypted traffic flows 125, capture devices 130 also store session key 127 separate from the data of the encrypted traffic flow 125. Capture devices 130 discard any traffic flows 125 that were not identified in flow information 135. Additional details regarding proxy server 110, client devices 120, capture devices 130, traffic flow 125, session keys 127, and flow information 135 are provided below in reference to FIG. 2.

Figure 2:
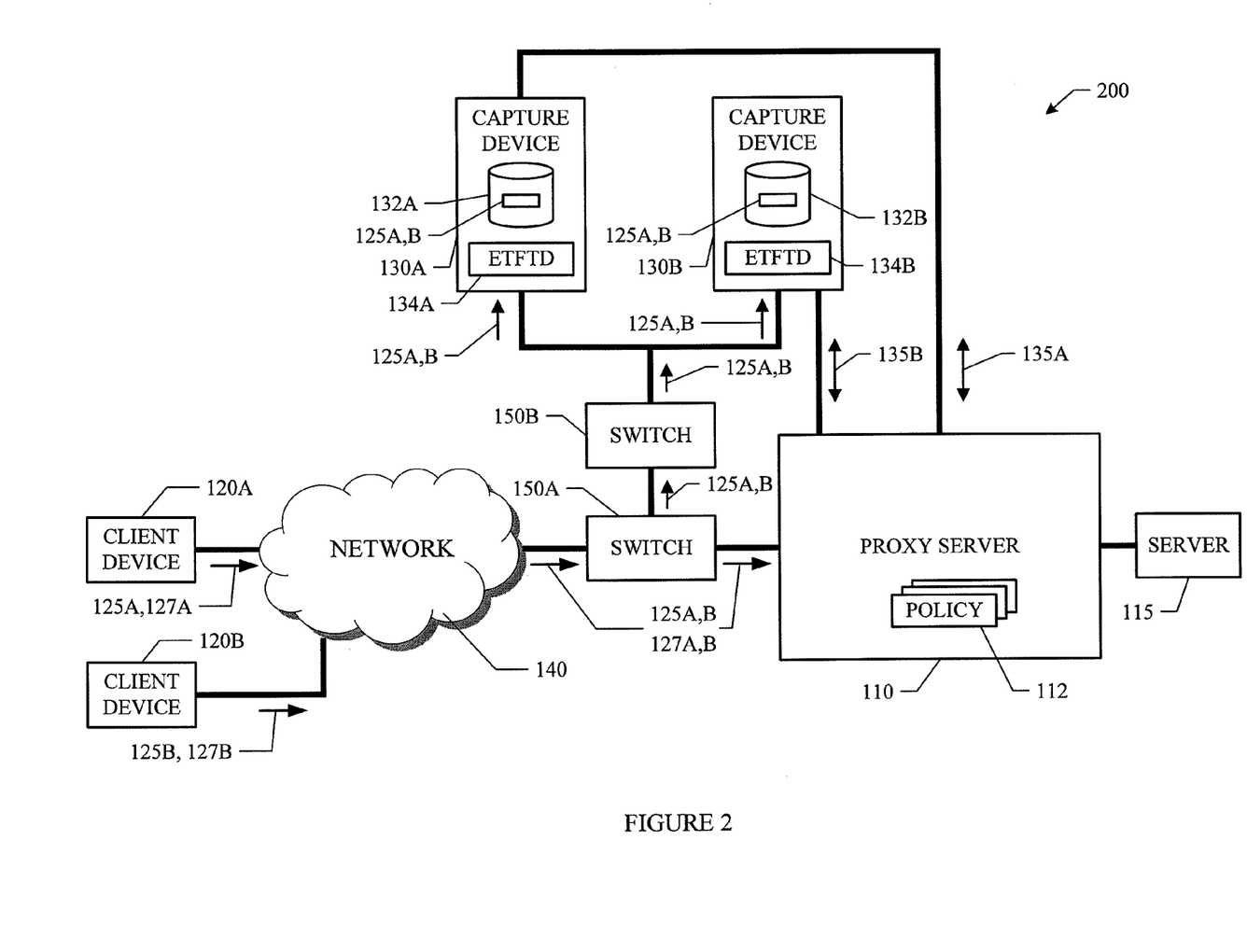

FIG. 2 illustrates an example system 200 for capturing network traffic according to certain embodiments of the disclosure. System 200 includes proxy server 110, client devices 120A and 120B, capture devices 130A and 130B, network 140, switches 150A and 150B, and server 115. Client devices 120A and 120B are communicatively coupled to network 140. Switch 150A is communicatively coupled to network 140, proxy server 110, and switch 150B. Proxy server is additionally coupled to capture devices 130A and 130B. Capture devices 130A and 130B are communicatively coupled to switch 150B. Server 115 is communicatively coupled to proxy server 110. While system 200 is illustrated as including two client devices 120, two capture devices 130, and two switches 150, other embodiments may include any number of these devices, in any appropriate configuration. In addition, other embodiments may include more networks 140, and the devices of system 200 may be communicatively coupled in any appropriate manner.

In certain embodiments, proxy server 110 is any computer system or application that is capable of terminating a communications session between client devices 120 and server 115 and then masquerading as server 115 to client devices 120 and as client devices 120 to server 115. In some implementations, proxy server 110 may be a ProxySG appliance by Blue Coat Systems Inc. of Sunnyvale, Calif. that supports secure web gateway and WAN optimization features. In certain embodiments, proxy server 110 performs one or more steps of one or more methods described or illustrated herein. In particular embodiments, proxy server 110 provides functionality described or illustrated herein. In particular embodiments, software running on proxy server 110 performs one or more steps of one or more methods described or illustrated herein or provides functionality described or illustrated herein.

Proxy server 110 may be in any suitable physical form. As example and not by way of limitation, proxy server 110 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, or a combination of two or more of these. Where appropriate, proxy server 110 may include one or more computing systems; be unitary or distributed; span multiple locations; span multiple machines; or reside in a cloud, which may include one or more cloud components in one or more networks. Where appropriate, proxy server 110 may perform without substantial spatial or temporal limitation one or more steps of one or more methods described or illustrated herein. As an example and not by way of limitation, proxy server 110 may perform in real time or in batch mode one or more steps of one or more methods described or illustrated herein. Proxy server 110 may perform at different times or at different locations one or more steps of one or more methods described or illustrated herein, where appropriate. In some embodiments, proxy server 110 may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems.

In certain embodiments, client device 120 may refer to any device that is capable of transmitting a traffic flow 125. In some embodiments, client device 120 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. Client device 120 may also include any suitable user interface, display, microphone, keyboard, or any other appropriate terminal equipment usable by a user. It will be understood that system 200 may include any number and combination of client devices 120.

In certain embodiments, capture device 130 is any device that is capable of receiving and storing data (i.e., traffic flows 125) from client devices 120. In certain embodiments, each capture device 130 receives and is capable of storing entire traffic flows (i.e., traffic flows 125A and 125B) from a span port of a network switch such as switch 150A. For example, each capture device 130 may receive and log an entire traffic flow 125 from the beginning of the flow (i.e., TCP connection negotiation) to the end of the flow (i.e., the end of TCP connection tear down). In certain embodiments, capture devices are configured to log traffic flows 125 at gigabit data rates and higher.

In certain embodiments, capture device 130 includes a storage device 132. As an example and not by way of limitation, storage device 132 may include a hard disk drive (HDD), a floppy disk drive, flash memory, an optical disc, a magneto-optical disc, magnetic tape, a Universal Serial Bus (USB) drive, a combination of two or more of these, and the like. In certain embodiments, storage device 132 may include any suitable database such as MySQL, commercially available databases from Oracle, Microsoft, IBM, and the like, an Apache Solr database, a Java Content Repository (JCR), or any other appropriate database or repository. Storage device 132 may include removable or non-removable (or fixed) media, where appropriate. Storage device 132 may be internal or external to capture device 130, where appropriate. In particular embodiments, storage device 132 is non-volatile, solid-state memory. In particular embodiments, storage device 132 includes ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates storage device 132 taking any suitable physical form. In addition, storage device 132 may include one or more storage control units facilitating communication between capture device 130 and storage device 132, where appropriate. Where appropriate, storage device 132 may include one or storage device 132. Although this disclosure describes and illustrates particular storage, this disclosure contemplates any suitable storage.

In certain embodiments, network 140 may refer to any interconnecting system capable of transmitting audio, video, signals, data, messages, or any combination of the preceding. Network 140 may include all or a portion of a public switched telephone network, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In certain embodiments, switch 150 is any network device that receives and transmits traffic flows 125 in a network. In certain embodiments, switch 150 is a multi-port network device that processes and routes traffic flows 125. In some embodiments, switch 150 may be a router or any other suitable network routing device. In certain embodiments, switch 150 includes a span port that is capable of transmitting a copy of traffic flows 125 observed on one or all switch ports of switch 150.

In certain embodiments, traffic flow 125 is any data that is communicated from client device 120. In certain embodiments, traffic flow is any packetized data such as IP data packets. Traffic flow 125 may be encrypted data, unencrypted data, or a mixture of both encrypted and unencrypted data. In certain embodiments, traffic flow 125 may refer to IPSec encrypted traffic, SSL encrypted traffic, or any other suitable encrypted traffic.

Session key 127 may refer to any appropriate security key that is communicated from client device 120 to proxy server 110 for the purpose of encrypting messages in a communication session between client device 120 and proxy server 110. In certain embodiments, session key 127 may be utilized to decrypt traffic flow 125 after it is received from client device 120. In certain embodiments, session key 127 may be generated according to SSL, TLS, or any other appropriate cryptography standard.

Flow information 135 is any appropriate data communicated from proxy server 110 to capture device 130 in order to instruct capture device 130 regarding which traffic flows 125 to capture and store. In certain embodiments, flow information 135 includes one or more of the following: a session key 127 received from a particular client device, an identification of a selected traffic flow 125, a security certificate (i.e., an X.509 certificate) associated with a particular client device 120 and/or server 115, a security certificate of proxy server 110 such as a certificate generated by proxy server 110 during the handshake with client device 120 for the purpose of intercepting the connection between client device 120 and server 115, and/or a lifetime of the session key 127. In certain embodiments, the identification of the selected traffic flow 125 may include an IP address of a particular client device 120, a port of switch 150 associated with a particular client device 120 or server 115, an IP address of server 115, a particular user associated with the selected traffic flow 125, a group that the particular user belongs to, an application being used by the particular user, operations being performed by the particular user, or any other information associated with traffic flow 125.

In certain embodiments, flow information 135 is communicated to capture device 130 across a secure communications channel. For example, a secure communications channel may be established between proxy server 110 and capture device 130 after proxy server 110 and capture device 130 have been authenticated to each other. For example, a security certificate associated with capture device 130 may be installed on proxy server 110 that enables capture device 130 to authenticate itself to proxy server 110. Likewise, a security certificate associated with proxy server 110 may be installed on capture device 130 that enables proxy server 110 to authenticate itself to capture device 130. In certain embodiments, capture device 130 may be additionally required to successfully register with proxy server 110 before flow information 135 may be communicated to capture device 130. In some embodiments, the identities of capture device 130 and proxy server 110 may be verified by a third party device (i.e., a server storing a database of past sales of capture devices 130 and proxy servers 110) before flow information 135 is communicated from proxy server 110 to capture device 130.

In operation of an example embodiment, client devices 120A and 120B attempt to communicate with server 115 across network 140. For example, client devices 120A and 120B may attempt to communicate with server 115 across the Internet using a secure communications session such as SSL, IPSec, and the like. Proxy server 110 masquerades as server 115 to client devices 120 and as client devices 120 to server 115 by intercepting the attempted communications sessions and establishing new communications sessions with client devices 120A and 120B. If secure communications sessions are established with client devices 120A and 120B, proxy server 110 receives a session key 127A from client device 120A and a session key 127B from client device 120B. As previously discussed, session keys 127A and 127B may be used to decrypt any encrypted data communicated from client devices 127A and 127B, respectively (i.e., traffic flows 125A and 125B). In general, encrypted traffic flows require specific session keys for the decryption of the traffic flows during or after the traffic exchanges have occurred.

Client device 120A transmits traffic flow 125A through network 140 where it is received by switch 150A and ultimately proxy server 110. Likewise, client device 120B transmits traffic flow 125B through network 140 where it is received by switch 150A and ultimately proxy server 110. In addition, because capture devices 130A and 130B are both communicatively coupled to a span port of switch 150A via switch 150B, both capture devices 130A and 130B each receive both traffic flows 125A and 125B from client devices 120A and 120B.

At any appropriate time, proxy server 110 selects a particular traffic flow 125 to store on a particular capture device 130. For example, proxy server 110 may select to store traffic flow 125A on either or both of capture devices 130A or 130B. As another example, proxy server 110 may select to store traffic flow 125B on either or both of capture devices 130A or 130B. To select which traffic flow 125 to capture and store on capture devices 130, proxy server may access one or more policies 112 stored on proxy server 110. For example, an administrator may interact with proxy server 110 and create a policy 112 that indicates to capture all traffic flows 125 from a particular IP address, entity, or switch port. As another example, a policy 112 may be created that instructs how to process particular traffic flows 125 (i.e., discard or save all traffic flows 125 from a particular IP range), or how to log particular traffic flows 125 (i.e., log a particular traffic flow for a certain amount of time and/or for a specific time of day). Proxy server 110 may access policies 112 and analyze any received traffic flows 125 against policies 112 in order to determine one or more traffic flows 125 to capture and store on one or more capture devices 130.

After selecting a particular traffic flow 125, proxy server 110 communicates flow information 135 to at least one capture device 130. For example, if proxy server 110 accesses policies 112 and determines that all traffic flows 125A from client device 120A should be logged, proxy server 110 communicates flow information 135A to capture device 130A and/or flow information 135B to capture device 130B in order to instruct one or both of these devices to capture and store traffic flow 125A. As another example, if proxy server 110 accesses policies 112 and determines that all traffic flows 125B from client device 120B should be logged, proxy server 110 communicates flow information 135A to capture device 130A and/or flow information 135B to capture device 130B in order to instruct one or both of these devices to capture and store traffic flow 125B. As described above, flow information 135 may in some embodiments include session key 127 and/or an identification of the selected traffic flow 125.

In certain embodiments, flow information 135, which may include a session key 127 for decrypting any encrypted traffic flows 125, is communicated from proxy server 110 to capture devices 130 via a secure communications channel. As described above, a secure communications channel may be established between proxy server 110 and capture device 130 after proxy server 110 and capture devices 130 have been mutually authenticated to each other. In some embodiments, proxy server 110 and/or capture devices 130 may be additionally verified against a database of known devices in order to verify their identity. By communicating flow information 135 (and in turn session key 127) between proxy server 110 and capture devices 130 across a secure communications channel, the security of any encrypted traffic flows 125 being stored by capture devices 130 remains intact.

Capture devices 130 store selected traffic flows 125 based on flow information 135 received from proxy server 110 across secure communications channels. For example, if flow information 135A indicates to capture traffic flow 125A, capture device 130A will capture and store traffic flow 125A in storage device 132A. As another example, if flow information 135B indicates to capture traffic flow 125B, capture device 130B will capture and store traffic flow 125B in storage device 132B. In certain embodiments, capture devices 130 discard any traffic flows 125 that were not identified in flow information 135. In the examples provided here, capture device 130A discards traffic flow 125B because flow information 135A only indicated to capture and store traffic flow 125A. Likewise, capture device 130B discards traffic flow 125A because flow information 135B only indicated to capture and store traffic flow 125B. Herein "discard" may refer to erasing any stored traffic flows 125 that were not identified in flow information 135, marking any stored traffic flows 125 that were not identified in flow information 135 as being eligible for being over-written, ignoring any incoming traffic flows 125 that were not identified in flow information 135, and the like.

For increased security, capture devices 130 may store session keys 127 separate from the data of the selected traffic flow 125. For example, capture device 130 may store traffic flow 125 in storage device 132 in the same format as it is when it is taken off the wire (i.e., encrypted). Then, capture device 130 may utilize an encrypted traffic flow tracking database (ETFTD) 134 to store information such as session key 127 received from proxy server 110. In certain embodiments, ETFTD 134 may be stored in a separate storage device 132, in a separate database, or any other location that is separate from where traffic flow 125 is stored. In some embodiments, ETFTD 134 may be encrypted and may store one or more attributes such as a time stamp, a user ID (i.e., a user name, IP addresses or port number), flow information 135, session key 127, a security certificate associated with client device 120 and/or server 115, and/or a storage location on disk that indicates where on storage device 132 that traffic flow 125 is stored in its original format. In other embodiments, ETFTD 134 may include any other appropriate attributes associated with traffic flows 125.

In certain embodiments, ETFTD 134 may be a searchable database, and capture device 130 may provide a user and/or an administrator the ability to query its ETFTD 134 for specific traffic flows 125 using any available attributes of ETFTD 134. For example, a user may interact with capture device 130A to query ETFTD 134A for traffic flows 125 from a specific IP address. As another example, a user may interact with capture device 130A to query ETFTD 134A for traffic flows 125 from a specific time of day. In certain embodiments, capture device 130 may export either decrypted or unencrypted traffic flows 125 to a network analyzer for further analysis. For example, capture device 130 may access a traffic flow 125 stored in storage device 132, access an associated session key 127 stored in ETFTD 134, decrypt the accessed traffic flow 125 using the associated session key 127, and then export the decrypted traffic flow 125 to a network analysis tool such as Wireshark for further analysis.

In certain embodiments, proxy server 110 may perform load balancing and/or fault tolerance of traffic capturing using two or more capture devices 130. For example, proxy server 110 may perform load balancing by instructing each capture device 130 to capture and store a different traffic flow 125. In the illustrated embodiment of FIG. 2, for example, proxy server 110 may perform load balancing by instructing capture device 130A to capture and store traffic flow 125A, while capture device 130B is instructed to capture and store traffic flow 125B. To perform fault tolerance of traffic capture (e.g., a backup), proxy server 110 may instruct two or more (or all) capture devices 130 to all capture the same traffic flows 125. In the illustrated embodiment of FIG. 2, for example, proxy server 110 may perform fault tolerance by instructing both capture devices 130A and 130B to capture and store both traffic flows 125A and 125B.

Figure 3:
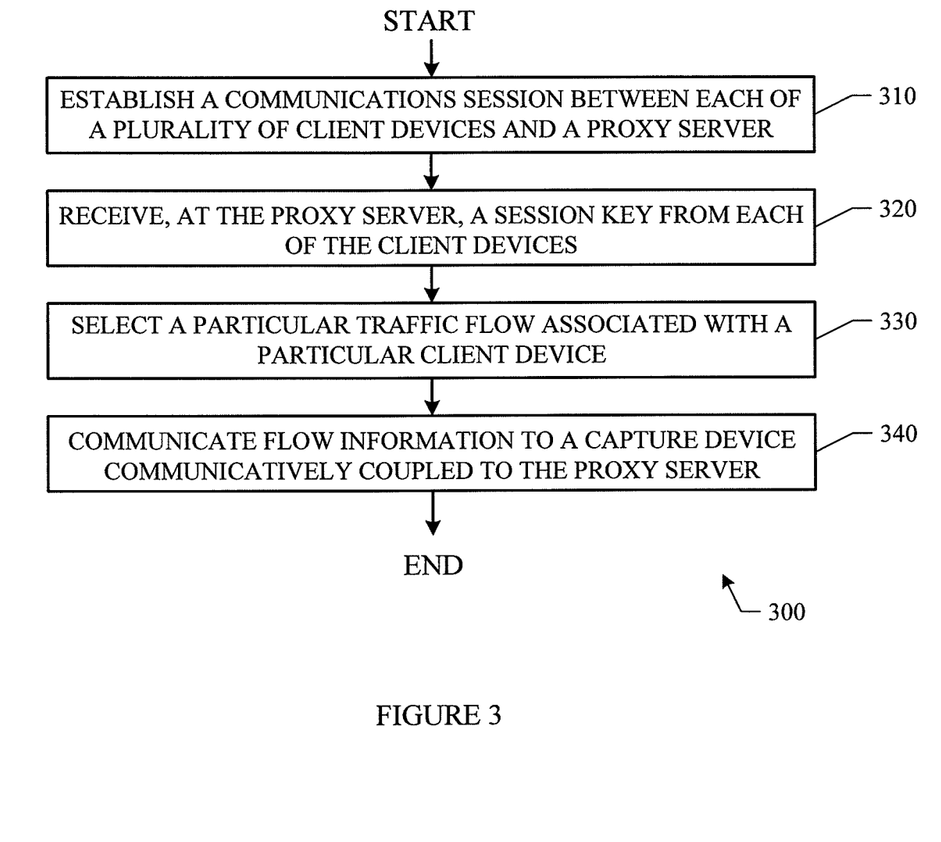
FIGS. 3 and 4 illustrate example methods for capturing network traffic, which may be performed by the example systems of FIGS. 1 and 2 according to certain embodiments of a present disclosure.

FIG. 3 illustrates an example method 300 for capturing network traffic, which may be performed by the example systems of FIGS. 1 and 2 according to certain embodiments of a present disclosure. Method 300 may be implemented in any suitable combination of software, firmware, and hardware. Although particular components may be identified as performing particular steps, the present disclosure contemplates any suitable components performing the steps according to particular needs.

At step 310, a communications session is established between each of a plurality of client devices and a proxy server. In certain embodiments, the proxy server may refer to proxy server 110 discussed above. In certain embodiments, the plurality of client devices may refer to client devices 120 discussed above. In certain embodiments, the communications session may refer to a secure communications session such as an IPSec communications session, as SSL communications session, or the like.

At step 320, a session key is received at the proxy server from each of the plurality of client devices. In certain embodiments, the session key may refer to session key 127 described above. In certain embodiments, the received session key may be a session key generated from SSL, TLS, or any other appropriate cryptography standard.

At step 330, the proxy server of step 310 selects a particular traffic flow associated with a particular client device to store on a first capture device. In certain embodiments, the traffic flow may refer to traffic flow 125 described above. In certain embodiments, the proxy server selects a particular traffic flow to store on a first capture device by accessing and analyzing one or more policies against the traffic flows. In certain embodiments, the one or more polices may refer to policies 112 discussed above.

At step 340, the proxy server communicates flow information to the first capture device of step 330. In certain embodiments, the flow information communicated to the first capture device may refer to flow information 135 described above. In certain embodiments, the flow information communicated to the first capture device includes the session key received from the particular client device in step 320. In certain embodiments, the flow information communicated to the first capture device includes an identification of the traffic flow selected in step 330. In some embodiments, the flow information is communicated to the first capture device across a secure communications channel after the first capture device and the proxy server have performed mutual authentication. After step 340, method 300 ends.

Figure 4:
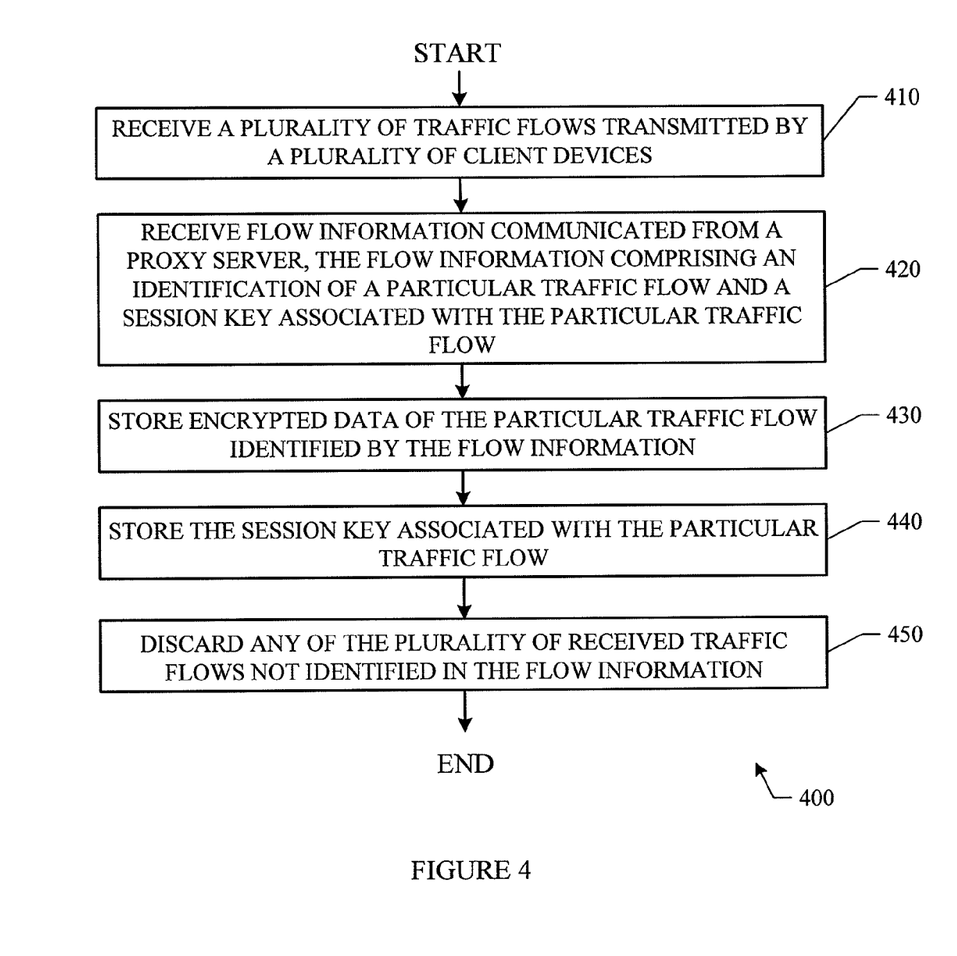

FIG. 4 illustrates an example method 400 for capturing network traffic, which may be performed by the example systems of FIGS. 1 and 2 according to certain embodiments of a present disclosure. Method 400 may be implemented in any suitable combination of software, firmware, and hardware. Although particular components may be identified as performing particular steps, the present disclosure contemplates any suitable components performing the steps according to particular needs.

At step 410, a plurality of traffic flows transmitted by a plurality of client devices are received at a capture device. In certain embodiments, the traffic flows may refer to traffic flows 125 discussed above. In certain embodiments, each of the traffic flows is associated with one of the plurality of client devices such as client devices 120 discussed above. In certain embodiments, the received traffic flows include encrypted data. For example, the traffic flows of step 410 may be IPSec or SSL encrypted traffic. In certain embodiments, all of the received traffic flows are stored in the capture device until a proxy server instructs the capture device on which traffic flows should be stored permanently. For example, all of the received traffic flows may be initially stored in the capture device until the capture device receives flow information from a proxy server in step 420 below that instructs the capture device on which traffic flows to store permanently and/or which traffic flows to discard.

At step 420, the capture device receives flow information communicated from a proxy server that is communicatively coupled to the capture device of step 410. In certain embodiments, the flow information communicated to the capture device includes a session key associated with a particular traffic flow. In certain embodiments, the flow information communicated to the first capture device includes an identification of a particular traffic flow. In some embodiments, the flow information is communicated to the capture device across a secure communications channel after the capture device and the proxy server have performed mutual authentication.

At step 430, the capture device stores encrypted data of the particular traffic flow identified by the flow information received from the proxy server in step 420. In embodiments where the capture device in step 410 initially stores all received traffic flows until instructed otherwise by the proxy server, the capture device in step 430 identifies the already stored encrypted data of the particular traffic flow identified by the flow information and marks it for permanent storage. In other embodiments, the capture device in step 430 begins storing encrypted data of the particular traffic flow identified by the flow information after the flow information is received from the proxy server in step 420. In certain embodiments, the encrypted data is stored in a storage device such as storage device 132. In certain embodiments, the encrypted data is stored in the same format as it is when it is captured from the wire.

At step 440, the capture device stores the session key associated with the particular traffic flow of step 420. In certain embodiments, the session key is stored separate from the encrypted data stored in step 430. In certain embodiments, the session key is stored in an encrypted database such as ETFTD 134 described above. In certain embodiments, the session key is stored in a separated storage device from the encrypted data stored in step 430.

At step 450, the capture device discards any of the received traffic flows that were not identified in the flow information from the proxy server. In certain embodiments, the capture device erases any stored traffic flows that were not identified in the flow information from the proxy server. In certain embodiments, the capture device marks any stored traffic flows that were not identified in the flow information as being eligible for being over-written. In some embodiments, the capture device ignores any incoming traffic flows that were not identified in the flow information from the proxy server. After step 450, method 400 ends.

Figure 5:
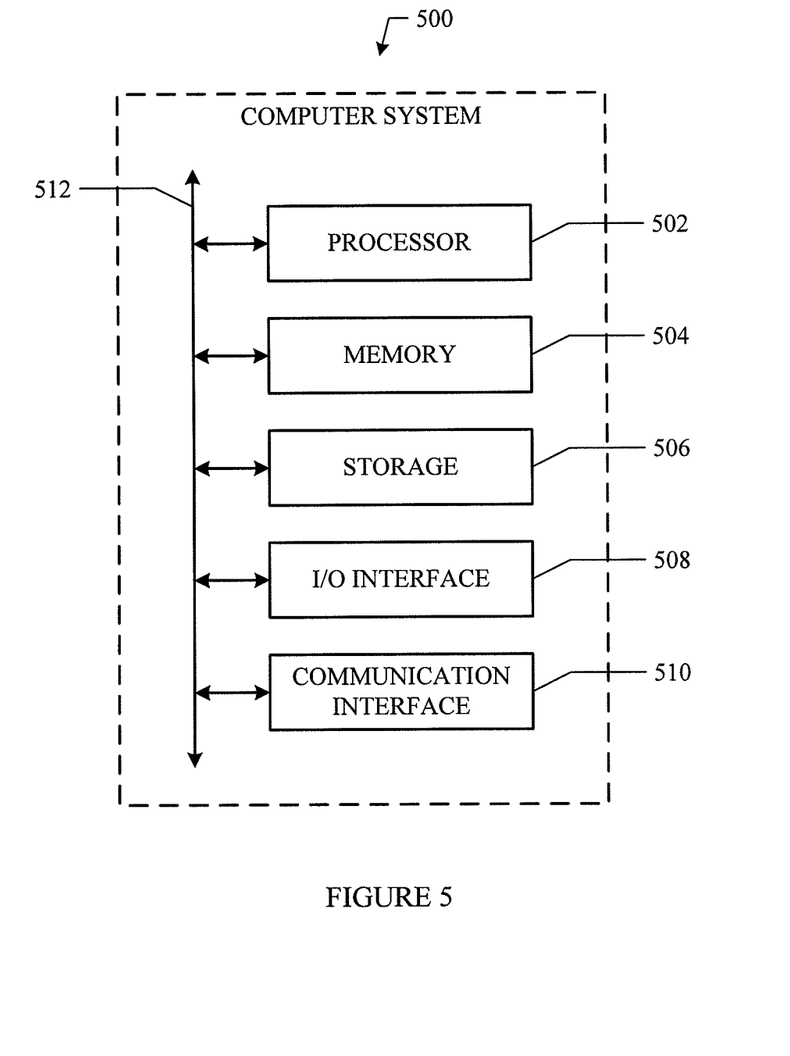
FIG. 5 illustrates an example computer system that may be used for one or more portions of the example systems of FIGS. 1 and 2, according to certain embodiments of the present disclosure.

Particular embodiments may be implemented on one or more computer systems. FIG. 5 illustrates an example computer system 500, which may implement a proxy server (e.g., proxy server 110) and/or a capture device (e.g., capture device 130). In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. A method comprising:
establishing, by a proxy server, a communications session between each of a plurality of client devices and the proxy server;

receiving, at the proxy server, a session key from each of the plurality of client devices;

selecting, by the proxy server, a particular traffic flow associated with a particular client device, the particular traffic flow selected from a plurality of traffic flows, each of the plurality of traffic flows being associated with one of the plurality of client devices and comprising encrypted data; and communicating, by the proxy server, flow information to a first capture device communicatively coupled to the proxy server, the flow information comprising the session key received from the particular client device and an identification of the particular traffic flow;

wherein:
the first capture device is configured to:
receive the plurality of traffic flows from the particular client device;
store the encrypted data of the particular traffic flow selected by the proxy server;
store the session key received in the flow information from the proxy server;
discard any of the plurality of received traffic flows not identified in the flow information received from the proxy server;
utilize the session key to decrypt encrypted data of traffic flows; and
export the decrypted data to a network analyzer for analysis; and
the proxy server and the first capture device are communicatively coupled to the particular client device through separate connections.

2. The method of claim 1, wherein the communications session between each of the plurality of client devices and the proxy server comprises a secure communications session.

3. The method of claim 1, wherein the flow information is communicated from the proxy server to the first capture device across a secure communications channel.

4. The method of claim 1, further comprising authenticating the proxy server to the first capture device.

5. The method of claim 1, further comprising:
communicating, by the proxy server, flow information to a second capture device communicatively coupled to the proxy server; and
performing, by the proxy server, load balancing between the first and second capture devices;
wherein the second capture device is configured to receive the plurality of traffic flows.

6. A system comprising:
a proxy server operable to:
establish a communications session with each of a plurality of client devices;
receive a session key from each of the plurality of client devices;
select a particular traffic flow associated with a particular client device, the particular traffic flow selected from a plurality of traffic flows, each of the plurality of traffic flows being associated with one of the plurality of client devices and comprising encrypted data; and
communicate flow information to a first capture device communicatively coupled to the proxy server, the flow information comprising the session key received from the particular client device and an identification of the particular traffic flow;
wherein:
the first capture device is operable to:
receive the plurality of traffic flows from the particular client device;
store the encrypted data of the particular traffic flow selected by the proxy server;
store the session key received in the flow information from the proxy server;
discard any of the plurality of received traffic flows not identified in the flow information received from the proxy server;
utilize the session key to decrypt encrypted data of traffic flows; and
export the decrypted data to a network analyzer for analysis; and
the proxy server and the first capture device are communicatively coupled to the particular client device through separate connections.

7. The system of claim 6, wherein the communications session between each of the plurality of client devices and the proxy server comprises a secure communications session.

8. The system of claim 6, wherein the flow information is communicated from the proxy server to the first capture device across a secure communications channel.

9. The system of claim 6, wherein the proxy server is further operable to authenticate the proxy server to the first capture device.

10. The system of claim 6, wherein the proxy server is further operable to:
communicate flow information to a second capture device communicatively coupled to the proxy server; and
perform load balancing between the first and second capture devices;
wherein the second capture device is operable to receive the plurality of traffic flows.

11. One or more computer-readable non-transitory storage media embodying software operable when executed by one or more computer systems to:
establish a communications session between each of a plurality of client devices and a proxy server;
receive a session key from each of the plurality of client devices;
select a particular traffic flow associated with a particular client device, the particular traffic flow selected from a plurality of traffic flows, each of the plurality of traffic flows being associated with one of the plurality of client devices and comprising encrypted data; and
communicate flow information from the proxy server to a first capture device communicatively coupled to the proxy server, the flow information comprising the session key received from the particular client device and an identification of the particular traffic flow;
wherein:
the first capture device ism configured to:
receive the plurality of traffic flows from the particular client device;
store the encrypted data of the selected particular traffic flow;
store the session key received in the flow information from the proxy server;
discard any of the plurality of received traffic flows not identified in the flow information received from the proxy server;
utilize the session key to decrypt encrypted data of traffic flows; and
export the decrypted data to a network analyzer for analysis; and
the proxy server and the first capture device are communicatively coupled to the particular client device through separate connections.

12. The media of claim 11, wherein the communications session between each of the plurality of client devices and the proxy server comprises a secure communications session.

13. The media of claim 11, wherein the flow information is communicated from the proxy server to the first capture device across a secure communications channel.

14. The media of claim 11, the software further operable when executed by one or more computer systems to authenticate the proxy server to the first capture device.

15. The media of claim 11, the software further operable when executed by one or more computer systems to:
communicate flow information from the proxy server to a second capture device communicatively coupled to the proxy server; and
perform load balancing between the first and second capture devices;
wherein the second capture device is configured to receive the plurality of traffic flows.

16. A method comprising:
receiving, by a capture device, a plurality of traffic flows transmitted by a plurality of client devices from the plurality of client devices, each of the plurality of traffic flows being associated with one of the plurality of client devices and comprising encrypted data;
receiving, by the capture device, flow information communicated from a proxy server communicatively coupled to the capture device, the flow information comprising an identification of a particular traffic flow and a session key associated with the particular traffic flow;
storing, by the capture device, encrypted data of the particular traffic flow identified by the flow information supplied by the proxy server;
storing, by the capture device, the session key associated with the particular traffic flow;
discarding, by the capture device, any of the plurality of received traffic flows not identified in the flow information supplied by the proxy server;
utilizing, by the capture device, the session key to decrypt the encrypted data of the particular traffic flow; and
exporting, by the capture device, the decrypted data to a network analyzer for analysis;
wherein the proxy server and the first capture device are communicatively coupled to the particular client device through separate connections.

17. The method of claim 16, wherein the proxy server is operable to:
establish a secure communications session between each of the plurality of client devices and the proxy server;
receive session keys from each of the plurality of client devices;
select the particular traffic flow from the plurality of traffic flows; and
communicate the flow information to the capture device across a secure communications channel.

18. The method of claim 16, wherein the flow information is received at the capture device from the proxy server via a secure communications channel.

19. The method of claim 16, further comprising authenticating, by the capture device using a certificate of the capture device stored on the proxy server, the capture device to the proxy server.

20. The method of claim 16, wherein storing the session key associated with the particular traffic flow comprises storing the session key separate from the encrypted data of the selected traffic flow.

21. The method of claim 16, wherein receiving the plurality of traffic flows comprises receiving the plurality of traffic flows from a span port of a network switch.

22. The method of claim 16, wherein storing the encrypted data of the particular traffic flow comprises storing information about the encrypted data in a searchable database.

23. A system comprising:
a capture device operable to:
receive a plurality of traffic flows transmitted by a plurality of client devices from the plurality of client devices, each of the plurality of traffic flows being associated with one of the plurality of client devices and comprising encrypted data;
receive flow information communicated from a proxy server communicatively coupled to the capture device, the flow information comprising an identification of a particular traffic flow and a session key associated with the particular traffic flow;
store encrypted data of the particular traffic flow identified by the flow information supplied by the proxy server;
store the session key associated with the particular traffic flow;
discard any of the plurality of received traffic flows not identified in the flow information supplied by the proxy server;
utilize the session key to decrypt the encrypted data of the particular traffic flow; and
export the decrypted data to a network analyzer for analysis;
wherein the proxy server and the first capture device are communicatively coupled to the particular client device through separate connections.

24. The system of claim 23, wherein the proxy server is operable to:
establish a secure communications session between each of the plurality of client devices and the proxy server;
receive session keys from each of the plurality of client devices;
select the particular traffic flow from the plurality of traffic flows; and
communicate the flow information to the capture device across a secure communications channel.

25. The system of claim 23, wherein the flow information is received at the capture device from the proxy server via a secure communications channel.

26. The system of claim 23, the capture device further operable to authenticate, using a certificate of the capture device stored on the proxy server, the capture device to the proxy server.

27. The system of claim 23, wherein storing the session key associated with the particular traffic flow comprises storing the session key separate from the encrypted data of the selected traffic flow.

28. The system of claim 23, wherein receiving the plurality of traffic flows comprises receiving the plurality of traffic flows from a span port of a network switch.

29. The method of claim 23, wherein storing the encrypted data of the particular traffic flow comprises storing information about the encrypted data in a searchable database.

30. One or more computer-readable non-transitory storage media embodying software operable when executed by one or more computer systems to:
receive a plurality of traffic flows transmitted by a plurality of client devices from the plurality of client devices, each of the plurality of traffic flows being associated with one of the plurality of client devices and comprising encrypted data;

receive flow information from a proxy server, the flow information comprising an identification of a particular traffic flow and a session key associated with the particular traffic flow;

store encrypted data of the particular traffic flow identified by the flow information supplied by the proxy server;

store the session key associated with the particular traffic flow;

discard any of the plurality of received traffic flows not identified in the flow information supplied by the proxy server;

utilize the session key to decrypt the encrypted data of the particular traffic flow; and export the decrypted data to a network analyzer for analysis;

wherein the proxy server and the first capture device are communicatively coupled to the particular client device through separate connections.

31. The media of claim 30, wherein the proxy server is operable to:

establish a secure communications session between each of the plurality of client devices and the proxy server;

receive session keys from each of the plurality of client devices;

select the particular traffic flow from the plurality of traffic flows; and communicate the flow information to the capture device across a secure communications channel.

32. The media of claim 30, wherein the flow information is received from the proxy server via a secure communications channel.

33. The media of claim 32, the software further operable when executed by one or more computer systems to establish the secure communications channel using a certificate stored on the proxy server.

34. The media of claim 30, wherein storing the session key associated with the particular traffic flow comprises storing the session key separate from the encrypted data of the selected traffic flow.

35. The media of claim 30, wherein receiving the plurality of traffic flows comprises receiving the plurality of traffic flows from a span port of a network switch.

36. The media of claim 30, wherein storing the encrypted data of the particular traffic flow comprises storing information about the encrypted data in a searchable database.

* * * * *